United States Patent [19]

Sakazume

[11] 4,103,492
[45] Aug. 1, 1978

[54] RESERVOIR IN MASTER CYLINDER OF VEHICLE BRAKING SYSTEM

[75] Inventor: Takeshi Sakazume, Yokohama, Japan
[73] Assignee: Tokico Ltd., Japan
[21] Appl. No.: 709,104
[22] Filed: Jul. 27, 1976

[30] Foreign Application Priority Data
Aug. 7, 1975 [JP] Japan .................. 50-96138

[51] Int. Cl.² .......................... B60T 11/26; F15B 7/08
[52] U.S. Cl. ........................................ 60/588; 60/592; 92/79; 137/574; 138/42
[58] Field of Search .................. 60/592, 588, 589, 585; 138/42; 92/79; 137/574, 582

[56] References Cited
U.S. PATENT DOCUMENTS

Re. 19,432  1/1935  Carroll ................................ 60/592
1,930,033  10/1933  Apple .................................. 60/592
3,823,561  7/1974  Zoppi .................................. 60/592

FOREIGN PATENT DOCUMENTS
739,867  7/1932  France ................................ 60/592

Primary Examiner—Martin P. Schwadron
Assistant Examiner—Abraham Hershkovitz
Attorney, Agent, or Firm—Wenderoth, Lind & Ponack

[57] ABSTRACT

A reservoir in a master cylinder for use in a vehicle braking system comprising two or more barrier plates vertically spaced and fitted in the reservoir to partition the interior of the reservoir into three or more chambers. Each of the plates has one or more through holes for restricting fluid flow across the plate, thereby preventing ingress of air bubbles into pressure chamber of the master cylinder.

5 Claims, 12 Drawing Figures

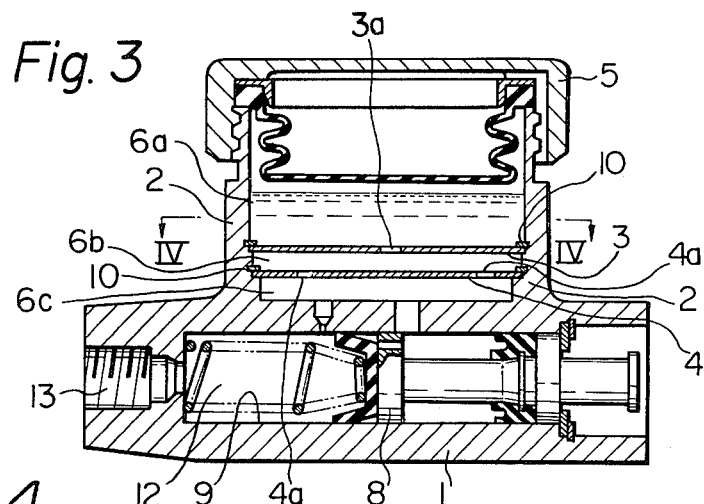
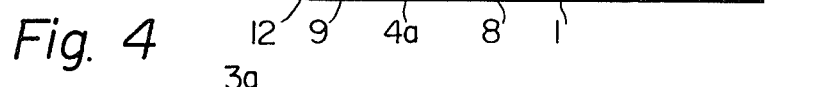
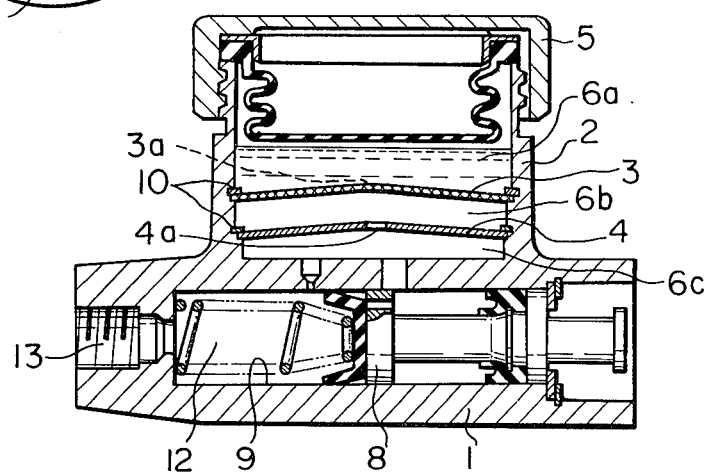

RESERVOIR IN MASTER CYLINDER OF VEHICLE BRAKING SYSTEM

BACKGROUND OF THE INVENTION

This invention relates to a reservoir for use in a master cylinder in a vehicle braking system.

A master cylinder in the braking system in a vehicle, particularly in a two-wheeled vehicle such as a motor cycle, is subjected to severe vibrations during its use, so that braking liquid contained in the reservoir of the master cylinder will be agitated vigorously with the result that air will be mixed into the braking liquid in the form of minute air bubbles, thereby exhibiting a milky white color. When the master cylinder is operated under such a condition to apply a brake, braking liquid including air bubbles therein is admitted into a pressure chamber in the master cylinder or into a brake cylinder. As the amount of air admitted into the pressure chamber or the brake cylinder is increased due to repeated braking operations, an ineffective stroke of a piston of the master cylinder is increased accordingly, resulting eventually in the complete loss of the braking function, if the situation becomes the worst.

SUMMARY OF THE INVENTION

The object of the present invention is to avoid the aforesaid shortcomings by providing two or more barrier plates fitted in the reservoir in a space filled with braking liquid in a manner such that the barrier plates partition the interior of the reservoir into three or more vertically spaced chambers, such that the barrier plates act to restrict fluid flow therethrough, whereby ingress of air bubbles into the pressure chamber of the master cylinder is prevented.

Preferably, the barrier plates are connected to each other so as to form a barrier plate assembly for providing convenience in mounting the barrier plates in the reservoir.

BRIEF DESCRIPTION OF THE DRAWINGS

The present invention will be described in more detail with reference to the accompanying drawings, in which:

FIG. 3 is a view similar to FIG. 1 but showing a third embodiment;

FIG. 4 is a plan view showing barrier plates in FIG. 3;

FIG. 5 is a cross-sectional view of a master cylinder incorporating a fourth embodiment;

DETAILED DESCRIPTION OF THE INVENTION

Figure 1:
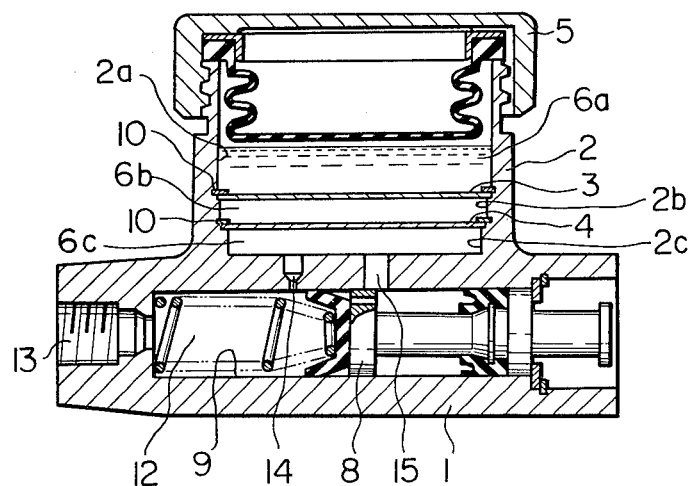
FIG. 1 is a longitudinal cross-sectional view of a master cylinder incorporating a reservoir according to the present invention.

Referring to FIG. 1, there is shown a master cylinder 1 comprising a piston 8 slidably disposed in a bore 9 for pressurizing liquid in a pressure chamber 12 to supply it to one or more brake cylinders (not shown) through a discharge port 13. On the upperside of the master cylinder 1, a reservoir 2 is disposed integrally therewith, and the pressure chamber 12 is communicated with the reservoir 2 through a relief opening 14 and a supply opening 15 according to conventional technique.

The interior of the reservoir 2 is divided into three chambers 6a, 6b and 6c by two barrier plates 3 and 4 formed of porous sheet-like material such as sintered metal or a metal network. The plates 3 and 4 are fitted in the reservoir 2 in a manner such that they are spaced vertically from each other to define the chamber 6b therebetween. For this end, the inner wall of the reservoir 2 is counterbored to define bore portions 2a, 2b and 2c as shown, and the plates 3 and 4 are positioned on the shoulders defined between the bore portions and are retained in their positions by retainer rings 10.

When braking liquid is filled in the reservoir and a cap 5 is tightened, some air is left in the upper portion of the reservoir 2 to prevent leakage of liquid therefrom in tightening the cap 5. When the master cylinder is subjected to severe vibrations, air and braking liquid in the chamber 6a will be agitated vigorously, with the result that the air is mixed into the braking liquid in the form of minute bubbles.

However, the barrier plate 3 disposed between the chambers 6a and 6b prevents ingress of the air bubbles into the chamber 6b to a large extent. In addition, minute air bubbles admitted into the chamber 6b will float in the chamber 6b since the movement of braking liquid in the chamber 6b is substantially small relative to that in the chamber 6a, so that ingress of the air bubbles into the chamber 6c through the plate 4 is substantially prevented. Accordingly, when the piston 8 is operated and braking liquid is admitted into the pressure chamber 12 from the chamber 6c, ingress of air bubbles into the pressure chamber 12 is completely prevented, and stable braking operation is assured.

It will be noted that the position of the barrier plate 3 in the reservoir is determined such that a certain amount of liquid is permanently left in the chamber 6a, that is, the position of plate 3 is determined to be lower than the minimum liquid level in the reservoir.

Figure 2:
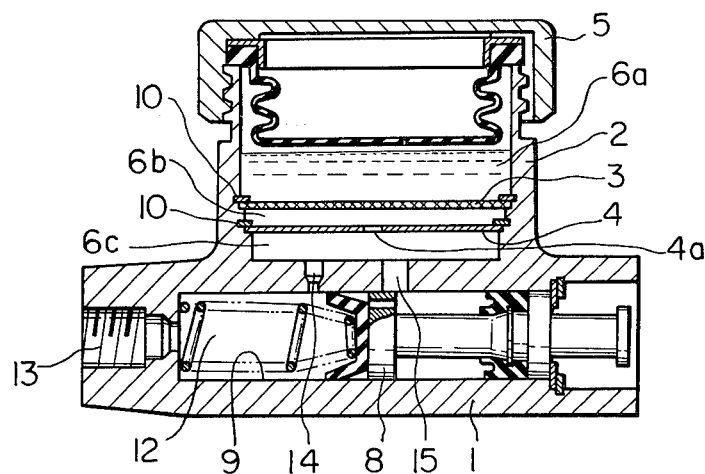
FIG. 2 is a view similar to FIG. 1 but showing a second embodiment of the present invention.

In FIG. 2 the barrier plate 4 is modified to comprise a solid plate-like member having one or more through holes 4a (only one is shown in the drawing) having suitable size and arrangement. The barrier plate 4 may be formed of metal or synthetic resin.

In FIGS. 3 and 4, the barrier plates 3 and 4 are modified to comprise solid plate-like members each having a plurality of through holes 3a and 4a as shown. The barrier plates 3 and 4 are formed of metal or synthetic resin. The through holes 3a and 4a are arranged such that they do not align vertically so that air bubbles passing through the through holes 3a cannot pass directly through the holes 4a.

The barrier plates 3 and 4 shown in FIG. 5 are similar to those shown in FIG. 2, but are modified to be a generally conical shape so that air bubbles introduced into the chambers 6b and 6c will easily return to the chambers 6a and 6b respectively. For this end a small opening 3a may preferably be disposed in the apex portion of the barrier plate 3.

According to another aspect of the present invention, the barrier plates 3 and 4 are integrally coupled to form a barrier plate assembly, thus allowing for an easier mounting operation.

Figure 6:
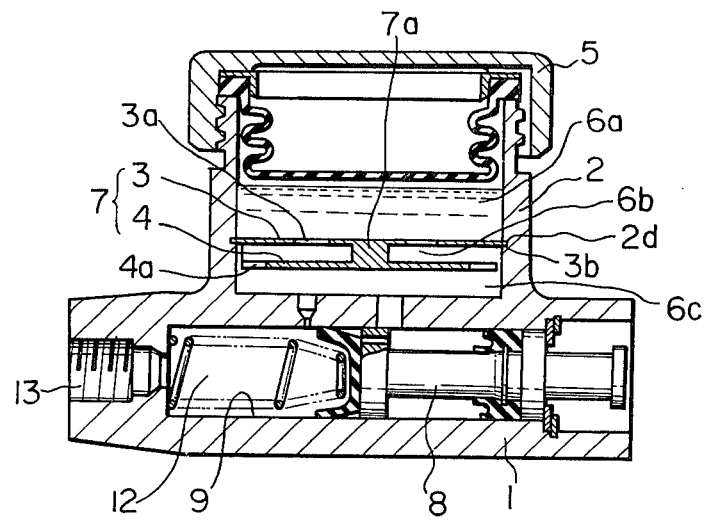
FIG. 6 is a cross-sectional view of a master cylinder incorporating a barrier plate assembly according to the present invention.
Figure 7:
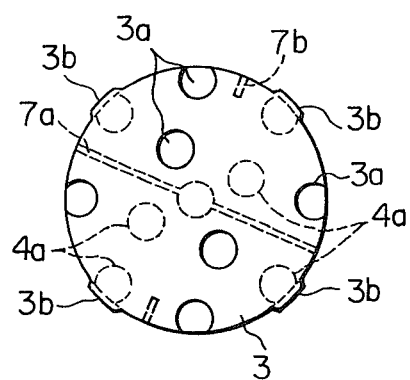
FIG. 7 is a plan view of the barrier plate assembly in FIG. 6.

The barrier plate assembly 7 shown in FIGS. 6 and 7 comprises an upper barrier plate 3 and a lower barrier plate 4 connected permanently by connecting members 7a and 7b. The barrier plate 3 has circumferentially spaced projections 3b for engaging with a complementary recess formed in the inner wall of the reservoir 2 to mount the barrier plate assembly 7 in the reservoir 2. The barrier plates 3 and 4 have through holes 3a and 4a respectively which are arranged in a staggered manner as shown in FIG. 7.

Figure 8:
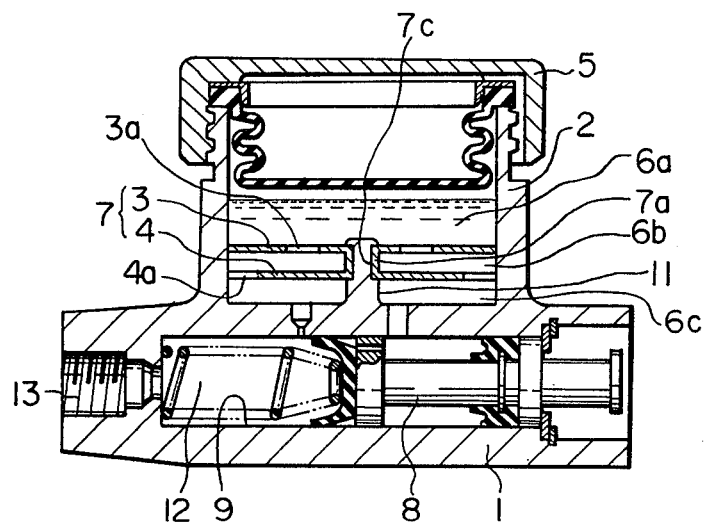
FIG. 8 is a view similar to FIG. 6 but showing a modified form of the barrier plate assembly.
Figure 9:
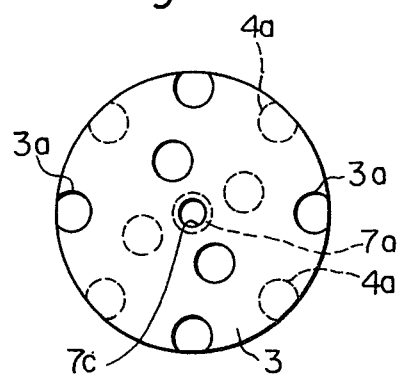
FIG. 9 is a plan view showing the barrier plate assembly in FIG. 8.

FIGS. 8 and 9 show a barrier plate assembly 7 of a modified form, in which the upper plate 3 and the lower plate 4 are integrally connected by a tubular connecting member 7a having a hole 7c therethrough which engages a projection 11 formed on the bottom of the reservoir 2. The assembly 7 is secured to the projection 11 by caulking, but it may be mounted by utilizing a screw.

Figure 10:
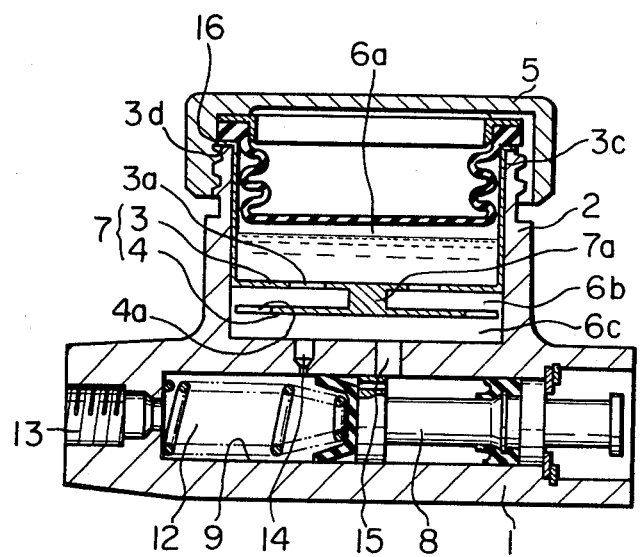
FIG. 10 is a cross-sectional view of a master cylinder incorporating a further modified barrier plate assembly according to the present invention.
Figure 11:
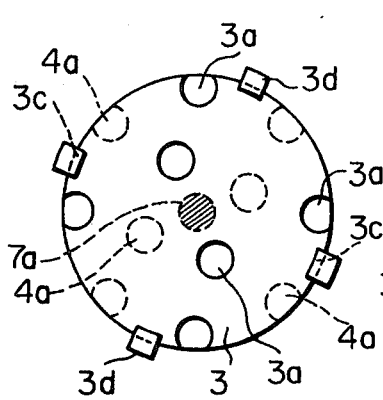
FIG. 11 is a plan view of the barrier plate assembly in FIG. 10.

FIGS. 10 and 11 show another embodiment of the present invention, in which upper end portions 3d of upwardly extending arms 3c engage respectively with radial grooves 16 formed in the upper surface of the reservoir 2, and the lower ends of the arms 3c are secured integrally with the upper barrier plate 3 which in turn is connected integrally with the lower barrier plate 4 by a connecting member 7a to form a barrier plate assembly 7. The assembly 7 is mounted in its position by tightening the cap 5. Alternatively, the arms may be formed to have the configuration of a cylinder so that the upper ends 3d may be provided in the form of a radial flange.

Figure 12:
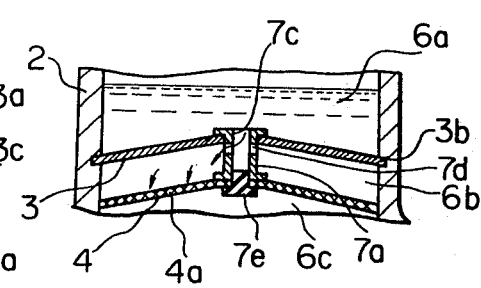
FIG. 12 is a fragmentary cross-sectional view of a reservoir of a master cylinder showing a barrier plate assembly of still a further modified form.

FIG. 12 shows a further modified form of a barrier plate assembly in which a conically shaped plate-like upper barrier plate 3 is integrally secured by a tubular connecting member 7a with the lower barrier plate 4 of a porous conically shaped member. The tubular member 7a has a longitudinal opening 7c and radial openings 7d through which the chambers 6a and 6b are communicated. The lower end of the longitudinal opening 7c is closed by a plug 7e, and thus communication between the chambers 6b and 6c is provided through openings 4a in the plate 4. The plates 3 and 4 provide inclined surfaces which act to collect and guide air bubbles moving along the lower surfaces of the barrier plates and into the upper chambers.

The barrier plates 3 and 4 in this embodiment, as well as in the preceding embodiments, may be formed of suitable materials and in suitable forms, for example, a metal plate, a synthetic resin plate, a network of metal, synthetic resin or the like (when the network is not itself rigid, a suitable backing plate or framework may be added), a porous material or the like. Further, it is not required that the upper and the lower plates be formed of the same material or have the same construction.

While respective embodiments show three chambers 6a, 6b and 6c defined in the reservoir 2, the present invention is by no means limited to only those chambers. Three or more barrier plates partitioning the interior of the reservoir into four or more chambers should also be considered to be within the scope of the present invention.

As is apparent from the foregoing description, the reservoir according to the present invention comprises two or more vertically spaced barrier plates dividing the interior of the reservoir into three or more chambers, so that the ingress of air into the lowermost chamber may be prevented. As a result, there is no possibility of air mixing with a liquid which is supplied from the reservoir into the pressure chamber. This prevents difficulties in the operation of the master cylinder while insuring stable operation of the brake.

In the embodiments in FIGS. 6 - 12, the barrier plates are coupled permanently to form a barrier plate assembly which can be mounted in the reservoir in a simple manner, and ingress of air into the lowermost chamber and into the pressure chamber will be prevented.

Further, the master cylinders shown in the embodiments are of a conventional type in which the reservoir is integrally connected to the master cylinder of a single piston type. But the present invention may be applicable to reservoirs of other types, for example, two chambers type connectable to a tandem master cylinder, or a reservoir of separate type.

What is claimed is:

1. A reservoir for a master cylinder of a hydraulic brake system for holding hydraulic brake fluid therein, said reservoir having at least two barrier plates stationarily disposed therein for partitioning the interior thereof into at least three vertically spaced fluid chambers, each of said chambers containing therein fluid, each of said barrier plates extending in a generally horizontal direction across the entire reservoir, each of said barrier plates having extending therethrough a plurality of hole means for allowing restricted fluid flow between adjacent said fluid chambers, said hole means formed in adjacent barrier plates being out of alignment in the vertical direction, the inner wall of the reservoir having a stepped configuration, and at least one of said barrier plates being supported on the upwardly facing shoulder defined by the step.

2. A reservoir for a master cylinder of a hydraulic brake system for holding hydraulic brake fluid therein, said reservoir having at least two barrier plates stationarily disposed therein for partitioning the interior thereof into at least three vertically spaced fluid chambers, each of said chambers containing therein fluid, each of said barrier plates extending in a generally horizontal direction across substantially the entire reservoir, each of said barrier plates having extending therethrough a plurality of hole means for allowing restricted fluid flow between adjacent said fluid chambers, said hole means formed in adjacent barrier plates being out of alignment in the vertical direction, and means for rigidly connecting together at least two adjacent barrier plates to thereby form a barrier plate assembly, said connecting means comprising a solid plug connecting said adjacent barrier plates substantially centrally thereof.

3. A reservoir as claimed in claim 2, wherein the outer periphery of the uppermost barrier plate of said barrier plate assembly is connected to the inner wall of the reservoir.

4. A reservoir as claimed in claim 3, wherein said outer periphery of the uppermost barrier plate of said barrier plate assembly is retained in an annular groove formed in the inner wall of the reservoir.

5. A reservoir for a master cylinder of a hydraulic brake system for holding hydraulic brake fluid therein, said reservoir having at least two barrier plates stationarily disposed therein for partitioning the interior thereof into at least three vertically spaced fluid chambers, each of said chambers containing therein fluid, each of said barrier plates extending in a generally horizontal direction across the entire reservoir, each of said barrier plates having extending therethrough a plurality of hole means for allowing restricted fluid flow between adjacent said fluid chambers, said hole means formed in adjacent barrier plates being out of alignment in the vertical direction, means for rigidly connecting together at least two adjacent barrier plates to thereby form a barrier plate assembly, said connecting means comprising a hollow plug having therethrough a central opening, and a strut extending upwardly from the bottom surface of the reservoir and extending through said central opening of said plug, such that said barrier plate assembly is supported by said strut.

* * * * *